US007006883B2

(12) United States Patent
Yamazaki (10) Patent No.: US 7,006,883 B2
(45) Date of Patent: Feb. 28, 2006

(54) PRODUCTION SYSTEM FOR COMPOSITE PRODUCT AND PRODUCTION METHOD FOR MANUFACTURING OF SAME

(75) Inventor: Shunpei Yamazaki, Tokyo (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 0 days.

(21) Appl. No.: 10/266,647

(22) Filed: Oct. 9, 2002

(65) Prior Publication Data

US 2003/0069658 A1 Apr. 10, 2003

(30) Foreign Application Priority Data

Oct. 10, 2001 (JP) ............... 2001-312249

(51) Int. Cl.
*G06F 19/00* (2006.01)
(52) U.S. Cl. .............. 700/97; 700/95; 700/96; 705/7
(58) Field of Classification Search ........... 705/7; 700/95–97, 100, 10, 116, 101; 703/1
See application file for complete search history.

(56) References Cited

U.S. PATENT DOCUMENTS

| | | | | |
|---|---|---|---|---|
| 4,459,663 A | * | 7/1984 | Dye | 700/100 |
| 4,641,341 A | * | 2/1987 | Kahn | 381/15 |
| 5,798,945 A | * | 8/1998 | Benda | 702/24 |
| 5,917,912 A | * | 6/1999 | Ginter et al. | 713/187 |
| 5,923,552 A | * | 7/1999 | Brown et al. | 700/100 |
| 5,974,395 A | | 10/1999 | Bellini et al. | |
| 6,001,671 A | * | 12/1999 | Fjelstad | 438/112 |
| 6,230,066 B1 | * | 5/2001 | Sferro et al. | 700/104 |
| 6,453,209 B1 | * | 9/2002 | Hill et al. | 700/95 |
| 6,557,020 B1 | * | 4/2003 | Amano et al. | 708/491 |
| 6,681,625 B1 | * | 1/2004 | Berkcan et al. | 73/204.23 |
| 6,748,287 B1 | * | 6/2004 | Hagen et al. | 700/99 |
| 6,868,387 B1 | * | 3/2005 | Krueger et al. | 705/7 |
| 2001/0025225 A1 | * | 9/2001 | Ota et al. | 702/84 |
| 2002/0007348 A1 | * | 1/2002 | Ali et al. | 705/51 |
| 2002/0012432 A1 | * | 1/2002 | England et al. | 380/231 |
| 2002/0032493 A1 | * | 3/2002 | Kadowaki et al. | 700/97 |
| 2002/0052807 A1 | * | 5/2002 | Han et al. | 705/27 |

(Continued)

FOREIGN PATENT DOCUMENTS

TW 327263 2/1998

OTHER PUBLICATIONS

"Toshiba and Tessera Announce Innovative Technology Licensing Agreement," Toshiba America Electronic Components, Tokyo, Sep. 13, 2000, http://www.toshiba.com/taec/press/to-106.shtml (last visited May 27, 2003).*

(Continued)

*Primary Examiner*—Paul Rodriguez
(74) *Attorney, Agent, or Firm*—Nixon Peabody LLP; Jeffrey L. Costellia (57) ABSTRACT

To provide a product development and manufacturing system to be used in the increasingly competitive electronic equipment market, which enables the process from product planning to design, manufacturing, and sales of a product to be performed efficiently while incorporating newly developed techniques, to thereby minimize or avoid risks. The present invention provides a production system for a product by multiple companies which enables multiple corporations or companies cooperating to perform product development, manufacturing and sales in a new product field, to mutually utilize techniques and sales networks owned by the respective companies to thereby further strengthen their competitiveness and develop their business.

6 Claims, 6 Drawing Sheets

U.S. PATENT DOCUMENTS

| | | |
|---|---|---|
| 2003/0149579 A1 * | 8/2003 | Begemann et al. ............ 705/1 |
| 2003/0149669 A1 * | 8/2003 | Howells et al. ............... 705/51 |
| 2003/0163214 A1 * | 8/2003 | Ouchi ......................... 700/97 |
| 2003/0225473 A1 * | 12/2003 | Yamazaki ................... 700/117 |
| 2004/0006544 A1 * | 1/2004 | Gulett ........................ 705/400 |
| 2004/0015427 A1 * | 1/2004 | Camelio ...................... 705/35 |

OTHER PUBLICATIONS

"Toshiba Signs Multi-Year, Multi-Billion Dollar Deal With Dell," Toshiba America Electronic Components, Irvine, Sep. 11, 2000, http://www.toshiba.com/taec/press/to-105.shtml (last visited May 27, 2003).*

* cited by examiner

PRODUCTION SYSTEM FOR COMPOSITE PRODUCT AND PRODUCTION METHOD FOR MANUFACTURING OF SAME

BACKGROUND OF THE INVENTION

1. Field of the Invention

The present invention relates to a development and manufacturing/sales system for a product produced through many procedures by multiple companies, and to a production method for the same. More particularly, the present invention relates to a production system and a production method for a product, such as a composite electronic equipment, which is assembled from element groups consisting of a plurality of members, and relates to a system in which technical cooperation, and product manufacturing and sales among multiple companies can be performed efficiently.

2. Description of the Related Art

In personal computers, portable telephones and other information processing devices and information communications processing devices, technological innovation is fast, and the lifecycle of a product is becoming shorter. At the heart of the technological innovations are higher performance of semiconductor products represented by the microprocessor (MPU) which has been achieved by miniaturization processing technologies, and higher performance of the operating systems and other software, which has been enabled by the increased performance of the semiconductor products. However, in order to deal with everything from the technical development to the design, manufacture and sales of semiconductor products within one company, large investments are required in terms of development costs, human resources, manufacturing equipment and the like, and this accompanies a significant risk.

Given these circumstances, the organization of manufacturers who manufacture and sell semiconductor products is changing toward specialization along the semiconductor manufacturing processes. Specifically, there are design houses which only do design, foundries which only do the pre-processes of the semiconductor manufacturing, and assembly houses which only do the post-processes, and the like. These companies supplement each other to thus shorten the product cycle, and thus occupy an important position in an environment of intensified competition in product development, manufacturing, marketing, and the like.

With PDAs (Personal Digital Assistants) and other such portable information processing devices or information communications devices which are predicted to diffuse even further, there is a need for a higher performance display device to serve as an interface with humans. A typical mode for achieving this is represented by a concept referred to as a "System on panel", which involves integrating a display portion, an input/output portion, a computational processing portion, a memory portion and the like onto 1 panel (a substrate) to achieve integrated functions, thus attaining not only increased performance but also size and weight reduction of the above-mentioned information processing systems and the information communications systems, so that they can be harmoniously incorporated into people's lifestyles.

In order to develop electronic equipment, which are increasingly large-scale, complex, and higher in performance, in a short amount of time, it is necessary to mutually link such things as: the system design by which the operations as a system are determined; the function and logic design that determines the logical circuitry functions; and the layout design by which the specific wiring patterns are determined, to thereby streamline the whole process.

Approaches for differentiating a company versus other competing companies may include competitive pricing. However, in order to gain a more predominant market share, it is necessary to achieve superior product functionality and superior product performance, and constantly provide new products to the market. Therefore, there is a tendency for the lifecycle of one product to become shorter, and development time becomes shorter as well. In an environment in which the development time is limited, when an attempt is made to make a change to the design at the layout design stage or other downstream stage of the development process, it becomes necessary to start over from the system design and the logical design, which may lead to a failure to meet a designated deadline. Further, it also becomes urgently necessary to apply for and secure patent rights or other industrial property rights for cutting-edge technologies involving higher functionality, higher performance, new manufacturing technique, or the like.

SUMMARY OF THE INVENTION

An object of the present invention is to provide a production system and a production method for use in the increasingly competitive electronic equipment market, which enables everything from product planning to design, manufacturing, and sales to be performed efficiently while incorporating newly developed techniques to thereby allow product development and manufacturing in which risks are minimized or avoided.

The present invention provides a production system and production method for a product by multiple companies, which enable multiple corporations or companies cooperating to develop, manufacture and sell a product to mutual utilize techniques and sales networks belonging to the respective companies, to further increase competitiveness and develop business, in a new product field.

A production system according to the present invention relates to a production system for a composite product assembled from a plurality of element groups, the system comprising:

a first corporation or business entity which prepares product information for a first element group determining functions and operations of the product including its system layout, logical design, layout design, and manufacturing process design, and has an industrial property right of the product information;

a second corporation or business entity which performs production of the first element group of the product based on the first product information and based on the industrial property right; and a third corporation or business entity which incorporates a second element group onto the first element group that is based on the industrial property right for the product, produces a module of the product, and sells the module or a product in which the module has been incorporated.

A production method according to the present invention relates to a production method for a composite product assembled from a plurality of element groups, the method comprising:

by a first corporation or business entity, storing into an information processing device product information that includes a system design, a logical design, a layout design and a manufacturing process design which determine functions and operations of the product, an identifier for identifying a type of the product, and corresponding manufacturing process and processing conditions;

by a second corporation or business entity, manufacturing the first element group of the product based on the product information in the information processing device and according to production plan information corresponding to each type of the product; and by a third corporation or business entity, manufacturing a second element group provided so as to fit with the arrangement of the first element group; assembling the product; and inputting the production yield and the production plan information for each type of the product into the information processing device.

The invention also relates to a production method for a composite product assembled from a plurality of element groups, the method comprising:

by a first corporation or business entity, performing system design, logical design, layout design, and manufacturing process design of the product; and storing an identifier for identifying the type of the product and corresponding manufacturing process and processing conditions into a first attributes information storage area of an information processing device;

by a second corporation or business entity, creating a manufacturing process program based on the information in the first attributes storage area in the information processing device; recording the identifier and production information including production volume, a production schedule, and a lot number for the corresponding product type, into a second attributes storage area in the information processing device; and manufacturing the first element group of the product according to the production information; and by a third corporation or business entity, manufacturing a second element group so as to fit with the arrangement of the first element group; and assembling the product; and recording the production yield and the production plan information for each type of the product into a third attributes storage area of the information processing device;

wherein the first through the third information processing devices are connected via special lines or via public lines, wherein the first corporation or business entity and the second corporation or business entity share the first attributes information storage area, and wherein the second corporation or business entity and the third corporation or business entity share the second attributes information storage area and the third attributes information storage area.

The invention also relates to a production method for a composite product assembled from a plurality of element groups, comprising:

by a first corporation or business entity, performing system design, logical design, layout design and manufacturing process design of the product; and storing an identifier for identifying the type of the product and corresponding manufacturing process and processing conditions into a first attributes information storage area of a first information processing device;

by a second corporation or business entity, creating a manufacturing process program based on the information in the first attributes storage area of the first information processing device; recording the identifier and production information including production volume, a production schedule, and a lot number for the corresponding product type, into a second attributes storage area in the information processing device; and manufacturing a first element group of the product based on the information in the second attributes information storage area in which the identifier and production yield for the corresponding product type are stored; and by a third corporation or business entity, manufacturing the second element group so as to fit with the arrangement of the first element group; and assembling the product; establishing the production plan information for each type of the product; storing an identifier and production yield for the corresponding product type into a third attributes information storage area of a third information processing device;

wherein at the first production line owned by the second corporation or business entity, a first identifier is assigned to each first substrate and processing conditions for each first substrate are assigned in association with the first identifier; information relating to the processing conditions is stored into the second attributes information storage area of the second information processing device; one grouping comprising the first substrates is loaded onto a carrier; a second identifier for distinguishing the one grouping is assigned to the carrier; management information consisting of an aggregate of processing conditions based on the first identifier is recorded into the second attributes information storage area of the second information processing device; the manufacturing process is managed based on process progress information obtained on the basis of the second identifier and processing information obtained on the basis of the first identifier; the first element group is formed to each of plural sections divided up on the first substrate; and a first quality information or characteristic information relating to the first element group formed on the first substrate between specific processes in the first process is collected and associated with the first identifier and saved in the second information processing device, and wherein at the second production line owned by the third corporation or business entity, the first substrate is divided into second substrates; one grouping consisting of the second substrates is treated as a second lot and is processed according to a second process; a second element group is formed in correspondence with a plurality of sections divided up on the second substrate; a second quality information or characteristic information relating to the second element group between specific processes in the second process, or a third quality information or product information in the sate where the first element group and the second element group have been composited are collected; the first quality information or characteristic information, and the second quality information or characteristic information, and the third quality information or product information are collated; information specifying an address of the section of the second substrate recognized as a non-defective product is recorded into the third attributes storage area in the third information processing device; the second substrate is separated into the sections to generate single-unit functional members; and only functional members which the address-specifying information indicates are non-defective products are selected and integrated with other functional members and modularized, to thereby produce a product in which the module has been incorporated.

Land transport, sea transport or air transport means may be involved between the second corporation or business entity and the third corporation or business entity.

In accordance with the above-mentioned construction of the present invention, the first corporation or business entity obtains the industrial property right for the system design, the logical design, the layout design, the manufacturing process design, the produced product, the production method and the method of use of the product, and the second corporation or business entity performs the production of the product based on the industrial property right which has been obtained. Further, the third corporation or business entity performs an action for further giving an added value to the product, and thus completes the manufacture of product.

In normal commercial activity, joint development by multiple corporations or companies, production under a partner's brand name, commissioned production or the like is conducted frequently. However, in accordance with the present invention, the development department which performs the system design, the functional and logical design for determining the logical circuitry functions, and the layout design that determines the specific wiring patterns, the manufacturing department which performs the manufacturing of semi-finished products, and the manufacturing department which receives the semi-finished products and manufactures finished products, are each separated and established independently from each other to thereby distribute their functions, and these functions are linked together and combined with elements supported by intellectual property rights, whereby risks can be distributed.

DETAILED DESCRIPTION OF THE PREFERRED EMBODIMENTS

Figure 1:
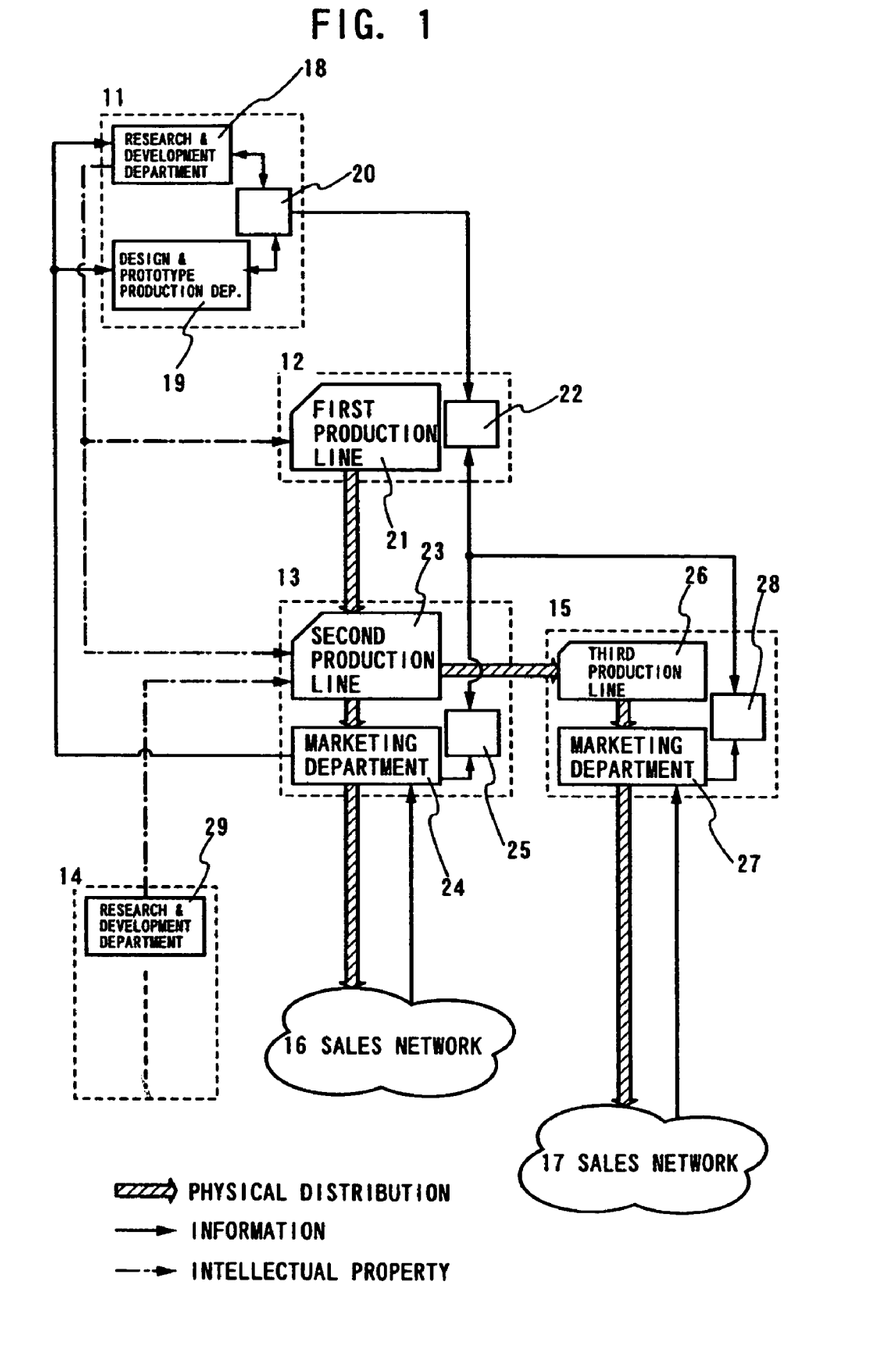
FIG. 1 is a diagram illustrating mutual relationships among development, manufacturing and sales of a product by multiple companies in accordance with the present invention.

Hereinafter, explanation will be made regarding an embodiment mode of the present invention, with reference to the drawings. FIG. 1 is a diagram illustrating a configuration of a system for development and manufacturing/sales of a product by multiple companies according to the present invention. In the present invention, at least three corporations of a first corporation 11, a second corporation 12, and a third corporation 13 are involved in the system. In addition to these, there are cases where a fourth corporation 14 and a fifth corporation 15 are also involved, as shown in the diagram.

In the present invention, the first corporation 11 has a research and development department 18 and a design and prototype production department 19. The research and development department 18 is the department where research and development is performed regarding parts or elements to be incorporated into a product, or regarding manufacturing techniques, and this department is also responsible for acquiring patent rights, utility models or other such industrial property rights. Further, the design and prototype production department 19 designs and makes prototypes which meet market requirements on product specifications, and this department performs testing before mass production of the given product. The manner the research department and the design and prototype department perform their work may take at least two forms. That is, they perform their work independently and create the market for a product, or they perform their work based on plans assigned to them from a marketing department 24 of the third corporation 13. The information that is accumulated at this point is stored in a first attributes storage area of a first information processing device 20.

The second corporation 12 has a first production line 21 equipped with a group of manufacturing devices comprising multiple manufacturing devices, which can successively process a plurality of procedures in parallel. As far as the manufacturing device is necessary to manufacture the product in question, there is no limitation whatsoever as to the construction or the specifications that it must have. The manufacturing process to be performed in the first production line 21 is prepared by the design and prototype production department 19 in the first corporation 11, and is prepared based on mask data, processing conditions, product quality management conditions and other various information stored in the first attributes storage area of the first information processing device 20. This information is sent via special lines or via public lines, and is stored in a second attributes storage area of a second information processing device 22.

Many workpieces to be subsequently processed are sent simultaneously into the first production line 21, but identifiers are used to distinguish these workpieces according to the lot, the product type and the product number. These production information are also stored in the second attributes area of the second information processing device 22, and are updated as occasion demands. Finished products are not manufactured on this first production line 21. Only the first element of the given product is manufactured and then sold to the third corporation as a semi-finished product.

The third corporation 13 has a second production line 23 equipped with a manufacturing device group comprising multiple manufacturing devices, and this production line is for incorporating a second constitutional element to the semi-finished product manufactured on the first production line to thereby produce a finished product. Among the information belonging to the second corporation 12, the production information being stored in the second attributes storage area of the second information processing device 22 is sent via special lines or via public lines to a third attributes storage area in a third information processing device 25 at the third corporation 13. This production information is compared against the production information generated at the second production line 23 to produce quality information, yield information and other such information about the product, and data regarding non-defective products is extracted.

The product manufactured at the second production line 23 is sold by the marketing department 24 at the third corporation 13 via the corporation's sales network 16. Further, the market information obtained through the marketing is recorded into the third attributes storage area in the third information processing device 25, and is sent to the research and development department and the design and prototype production department of the first corporation 11 to provide feedback for development of products with new functions and specifications.

The first through third information processing devices are connected via special lines or via public lines, and the first corporation or business entity and the second corporation or business entity share the first attributes information storage area. The second corporation or business entity and the third corporation or business entity share the second attributes information storage area and the attributes information storage area.

Further, depending on the type of the product, after the second constitutional element has been added on at the second production line 23, a third constitutional element may be added to complete the product at a third production line 26 at the fifth corporation 15. Further, it is also possible to produce a product manufactured by adding the third constitutional element to the first constitutional element that was added at the first production line 21. In such a case, a storage medium 28 serves a similar function as other storage media. The product that is ultimately completed at the firth corporation 15 may be sold by the marketing department 27 of the fifth corporation 15 through the company's own sales network 17.

Thus, the research and development department and the design and prototype production department play an important role in achieving development of a composite product assembled from the first constitutional element, the second constitutional element and the third constitutional element, and manufacture and sales of the product, all in a short amount of time. The research and development department 18 develops the new product, the manufacturing method thereof and method for running the manufacturing and the like. Simultaneously, it acquires and holds the patent, trademark, design and other industrial property rights. Based on the thus newly developed technique, the design and prototype production department 19 makes mass production prototypes and performs reliability testing and the like, and uses the thus obtained technical information to be reflected on the manufacturing devices and the processing conditions for the first production line 21.

A system may also be adopted in which the research and development department 18 and the design and prototype production department 19, and the first production line 21 and the second production line 22, are each owned by separate corporations. The patent right and the like which are owned by the first corporation 11 are protected by means of giving a non-exclusive license or an exclusive license to the second corporation 12 which owns the first production line 21. Further, as regards the third corporation that owns the second production line 23, the protection is afforded by giving it a non-exclusive license or an exclusive license for the product that was produced on the first production line 21. The royalties accrued may be used for developing a superior product, whereby the research and development and the diffusion of the composite product onto the market are accelerated.

However, on the other hand it is practically impossible to secure all industrial property rights for composite products which have increasingly higher functionality. Therefore, a reasonable strategy would also include, for example, introducing the techniques relating to the patented invention from a research and development department 29 of the fourth corporation 14, and having the fourth corporation 14 establish a non-exclusive or exclusive license. Accordingly, the first corporation 11, which has the research and development department 18 and the design and prototype production department 19, can concentrate its capital in its own strengths. Therefore, corporations with production lines can distribute their risks.

Explanation has been made above regarding an embodiment mode of the present invention. However, the present invention may also be implemented in many different forms, and a person skilled in the art can easily make various modifications to the configuration and the details of the present invention without departing from the gist and scope thereof. Therefore, the present invention is not to be interpreted as limited to the content described in the present embodiment mode thereof.

[Embodiment]

Figure 2:
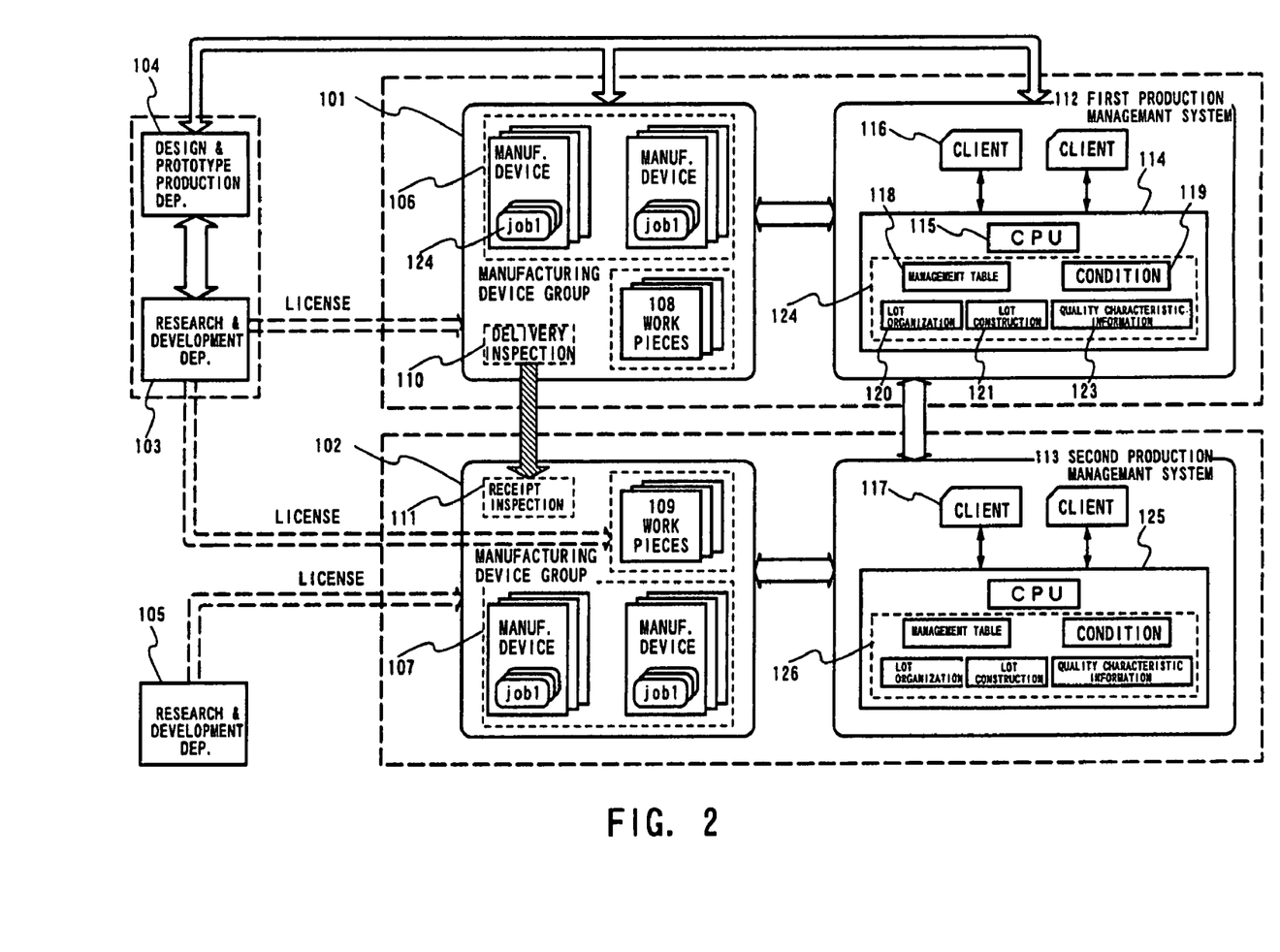
FIG. 2 is an outline structural diagram illustrating an example of a production system in accordance with the present invention.

Detailed explanation will be made regarding an embodiment of the present invention, with reference to the diagrams. FIG. 2 depicts one embodiment of the product development and product manufacturing/sales by multiple companies in accordance with the present invention. The production system according to the present embodiment is a system for performing development, production and sale of a composite product assembled from multiple function elements made of different constitutional materials, different constitutional members and/or made with different constructions, and includes a plurality of production lines appropriate for the production of each of the function elements. The mode shown in FIG. 2 illustrates a mutual relationship between a first production line 101 and a second production line 102, but the present invention does not impose any limitation on the number of production lines which are mutually linked. The first production line 101 and the second production line 102 may be physically or geographically distinguished or may be distinguished as belonging to separate corporations, and may be set up at mutually removed locations or areas.

The first production line 101 comprises a manufacturing devices group 106 comprising multiple manufacturing devices, and it is capable of processing multiple processes successively and in parallel. The construction or specifications of the manufacturing devices are not restricted whatsoever as long as they are necessary for the manufacture of the product in question.

A workpiece 108 to be processed is supplied to the first production line 101, but there is no particular restriction as to the configuration of the workpiece 108. In a case where the composite product in question relates to an electronic equipment, a semiconductor substrate, a glass or quartz substrate, a printed board and the like are applied. On top of the substrate configured as such, there is formed an element group consisting of a plurality of semiconductor elements that are integrated/formed together. For example, there is formed a TFT panel or the like, which is formed by arranging thin film transistors (TFTs) in matrix.

The workpiece 108 is supplied to the production line as a single sheet or as a plurality of sheets formed as a single grouping called a "lot". In order to distinguish each one, each of the workpieces 108 (specifically, each individual substrate sheet) is assigned an identifier. Further, in order to distinguish the lots, an identifier is assigned to each carrier which holds a single sheet or multiple sheets of the workpiece 108 and is used for movement within the production line. Numbers, symbols, letters, marks, bar codes, block codes, color codes, magnetic tape and other such signs are used as appropriate for the identifiers, and the information held by the identifiers is read by optical, magnetic, electromagnetic, optical magnetic or mechanical means.

An example of a first production management means 112 which functions as an information processing device that performs management production or progress management on the first production line 101, is a client/server system that comprises a server (a division/synthesis management system) 114 and a client (an information gathering input/output terminal) 116. The server 114 includes a CPU (central processing unit) 115 and a storage device 124, and in the storage device 124 there are written a process management table 118, process conditions 119, lot organization 120, lot construction 121, quality characteristic information 123 and the like, and while the production line is working, updating and modification processes are constantly being performed. The client 116 is constituted by input means such as a mouse, an image scanner, or a code reader; output means such as a monitor or a printer; and storage means such as a hard disk, and the like. Of course, the production management means is not limited to this client-server system. Depending on the information volume that is to be processed, the production management means may be constructed with a mainframe. If the scale of the system is small, then it may also be constructed with a personal computer.

Figure 3:
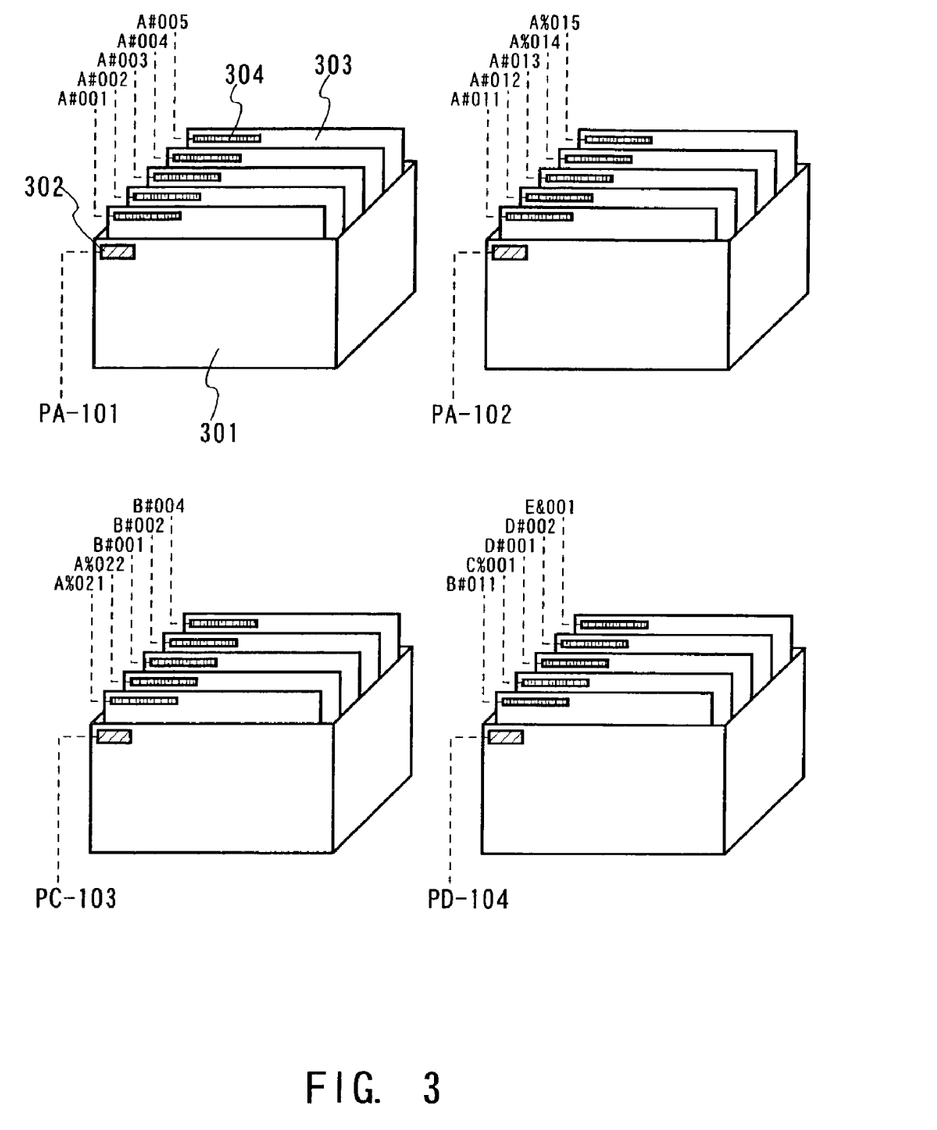
FIG. 3 is an outline diagram illustrating an example of utilization of lot organization and identifiers corresponding to production of multiple types of composite products in accordance with the present invention.

Multiple lots are constantly being supplied to the first production line 101 in order to increase the utilization efficiency of the manufacturing device group 106 and maximize productivity. When doing this, a first production management means 112 performs process management, and identifiers are used to distinguish each of the multiple lots and the multiple workpieces 108. One example of the identifier for distinguishing each of the lots and the workpieces is shown in FIG. 2. The workpieces are held in a vessel or framework called a "carrier", which used to move them among the manufacturing devices. In FIG. 3, multiple workpieces 303 are being held in a carrier 301, and a first identifier 304 has been applied to each of the workpieces 303. For the identifiers 304, numbers, symbols, letters, marks, bar codes, block codes, color codes and the like may be used. Further, a second identifier 302 is applied to the carrier 301 to be associated with information about the workpieces 303 in the carrier.

The production unit referred to as the "lot" may also be organized per carrier, and it is also possible to adopt a configuration which includes multiple lots inside each carrier. As described above, the workpieces 303 are moved among the manufacturing devices by means of the carrier 301 within the product line. Therefore, by maximizing the loading capacity of the carrier 301, the process waiting time is minimized, and this contributes to maximizing the productivity.

Figure 4:
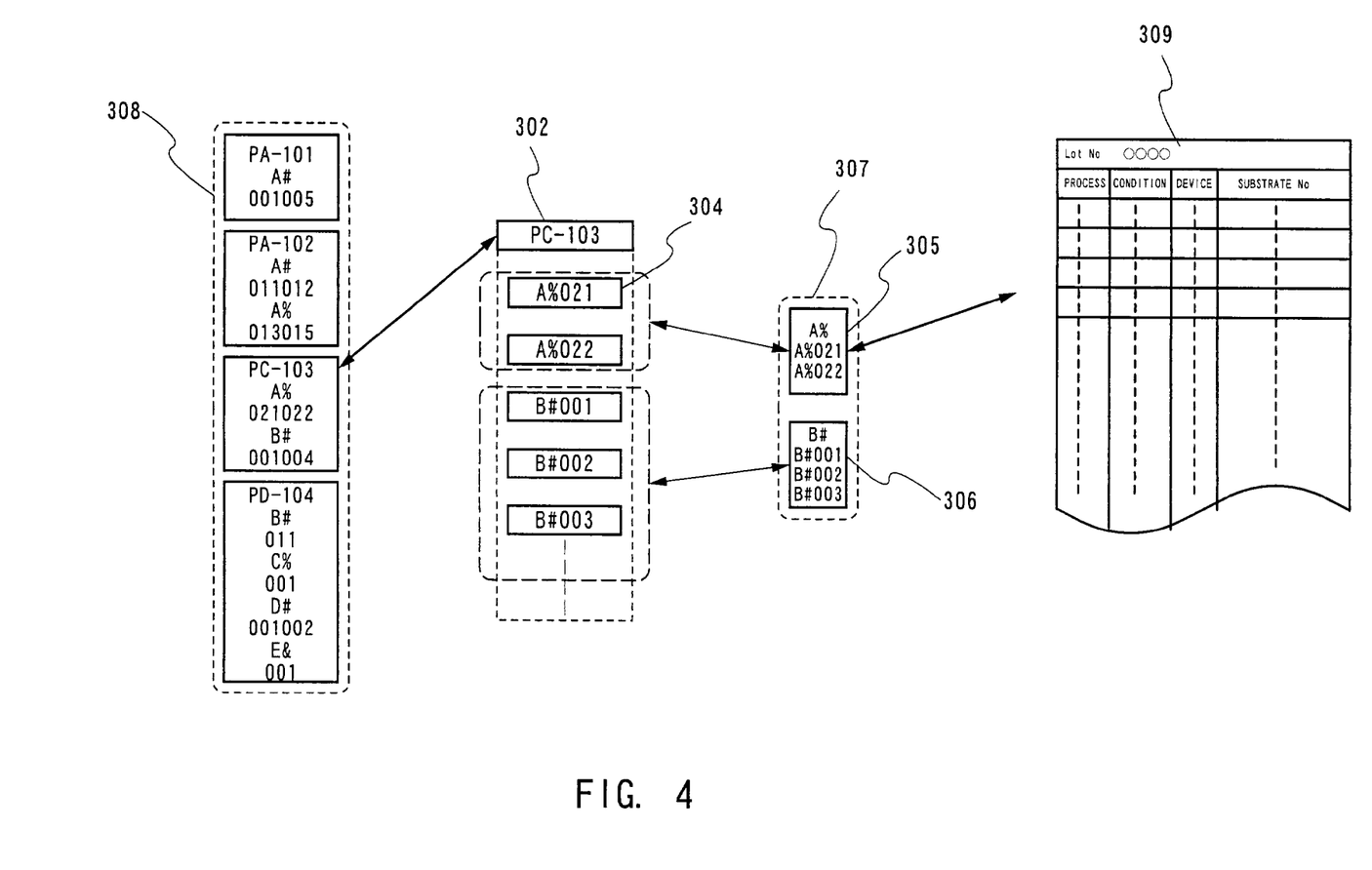
FIG. 4 is a diagram for explaining mutual relationships between the lot organization information and the identifiers corresponding to production of multiple types of composite products in accordance with the present invention.

FIG. 4 illustrates in detail an example of the links between the first identifier and the second identifier, and the process management table 118, the process conditions 119, the lot organization 120 and the lot construction 121 in the first process management system 112 that was explained using FIG. 2.

In the example shown in FIG. 4, inside the carrier assigned with the second identifier 302, there are included at least two lots consisting of a first lot 305 on which "A %" is written, and a second lot 306 on which "B#" is written. The breakdown of each of the lots is saved as hierarchical data called "lot construction" 307. Within each of the lots, each of the workpieces is assigned a first identifier. These lots can be configured to have different functions, features, standards, sizes, types and the like according to product specifications, and different process conditions may be assigned for these. The process conditions 309 are created for each lot, and it is possible to further modify the manufacturing conditions for each workpiece within the each of lots. Further, all of the lots which are supplied to the production line are saved as hierarchical data called the "lot organizations" 308.

Figure 5:
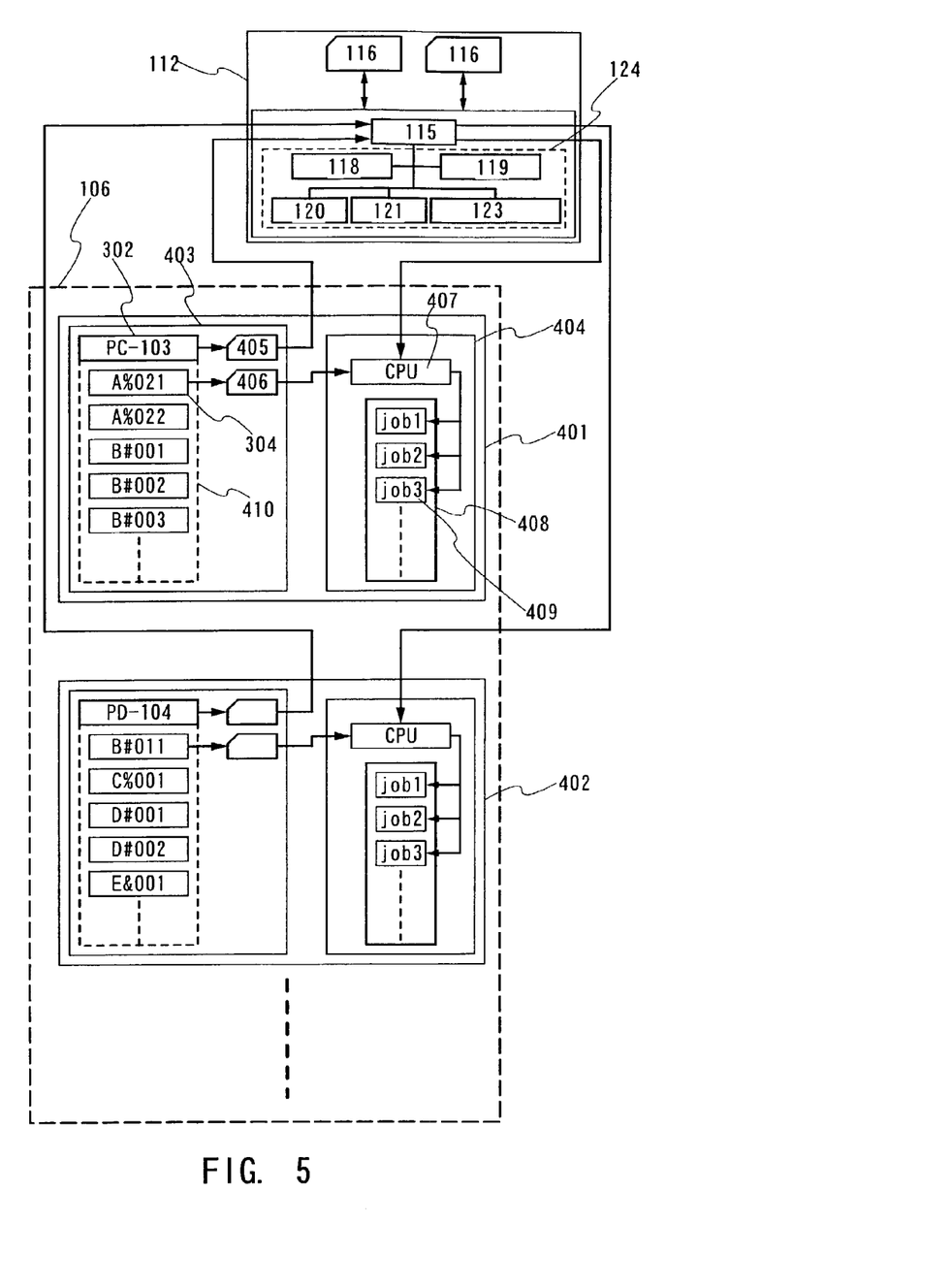
FIG. 5 is a diagram for explaining construction of mutual information transmission between a manufacturing device group and production management means in a production line, in accordance with the present invention.

FIG. 5 illustrates an example of utilization of the identifiers in the production line. FIG. 5 illustrates the main constitutional requirements for the manufacturing device group 106 and the first production management means 112 in the first production line 101. The manufacturing device group 106 includes a manufacturing device 401, and this manufacturing device can be understood as consisting of two parts, that is, a carrier station 403 holding a carrier 410 for transporting within the production line, and a manufacturing device main unit 404. The carrier station 403 is provided with reading means 405 for reading the second identifier 302 and reading means 406 for reading the first identifier 304. These reading means work by means of optical, magnetic, electromagnetic, optical magnetic, or mechanical means, and a CCD camera is typically used.

The information of the second identifier 302 which is recognized by the reading means 405 is sent to the first production management means 112, and this is compared/referenced against the data groups of the process management table 118, the process conditions 119, the lot organization 120, the lot construction 121, and quality characteristic information 123 which are stored in the storage device 124 in the first production management means 112, and the information of the first identifier 304 in the given lot and the information about the name of a process processing program that corresponds to that information are sent to the manufacturing device 401. At the manufacturing device 401, the reading means 406 sends the information of the first identifier 304 that is assigned to the workpiece to a CPU 407 in the manufacturing device 401, and this is compared/referenced against the above-mentioned information that was sent from the first production management means 112, so that a program 409 of given processing conditions (e.g., job 1) which is saved in the storage means 408 is read out and executed. The manufacturing device 402 is constructed similarly, and the manufacturing device group 106 is constructed arranged with a plurality of manufacturing devices which are constructed in this way. In the manufacturing device groups, manufacturing devices having similar functions are arranged in the same area. This is for efficiently arranging the manufacturing devices, which require utilities such as electricity, compressed air, cooling water, exhaust ducts and the like in order to operate, and also pipes and the like for supplying raw materials or supplementary materials.

As shown in FIG. 2 through FIG. 5, it is possible to use the first identifier and the second identifier to manage the information relating to the process conditions, the lot organization, and the lot construction, and also link together the process management system and the manufacturing devices by means of a LAN (Local Area Network) to thereby achieve centralized management of the production line. Also, it is possible to reduce the information processing load on the manufacturing devices and perform the processing without jumbling the large number of lots and the complexly organized lots or production units.

A manufacturing device group 107 at the second production line 102, and a second process management system 113 comprising a server 125, a storage device 126, a client 117 and the like, can also use a similar construction, so detailed explanation thereof has been omitted.

Further, in the first production line 101 and the second production line, in-process inspections for quality management and quality control are performed as needed between specific production processes. As regards the quality information and characteristic information obtained through the inspections performed between the specific processes, either of total inspection whereby inspections are performed on all of the workpieces, or sampling inspection whereby inspection is with each lot or at given intervals, is chosen according to the purpose. Further, this information is saved in the storage device 124 of the first production management means 112 or the storage device 126 in the second production management means 113, after being associated with either the first identifier or the second identifier. The information obtained from these in-process inspections may be quality information or characteristic information regarding the constitutional element of the product that was added at the first production line 101, or may be quality information or characteristic information regarding the constitutional element of the product that was added at the second production line 102, or may be synthesized quality information or characteristic information regarding the constitutional elements that were added by both the first production line 101 and the second production line 102. The first production management means 112 and the second production management means 113 may be connected by a communications line, to thereby mutually share the quality information or characteristic information between them.

Depending on the specifications of the manufacturing device group 107 in the second production line 102, the workpieces 108 that have been sent out from the first production line 101 may be divided into individual sizes to organize a new second lot. Therefore, the identifier from the first production line 101 may be used just as it is for the identifier at the second production line 102, and in the case where the workpiece 108 is divided into individual sizes, new identifiers may be added.

Transporting of the workpieces or the semi-finished products between the first production line 101 and the second production line 102 is performed as follows: onto the workpiece 108 there is formed a protective film for preventing breakage of the first element group due to environmental pollution or static electricity, and then the workpiece 108 is packaged and sent, and at the second production line 102 the process to be performed there is performed after the protective film is removed. Further, a delivery inspection is performed when the product is shipped out from the first production line 101, and then a receipt inspection is performed at the second production line 102. The delivery inspection 110 and the receipt inspection 111 (in FIG. 2) are performed by inspection devices having the same construction, and the respective inspection results are compared/referenced against each other to thereby inspect for changes in quality attendant on transportation. This also provides useful information for establishing rational judgement criteria for determining the number of non-defective products from among the shipped and received products.

Figure 6:
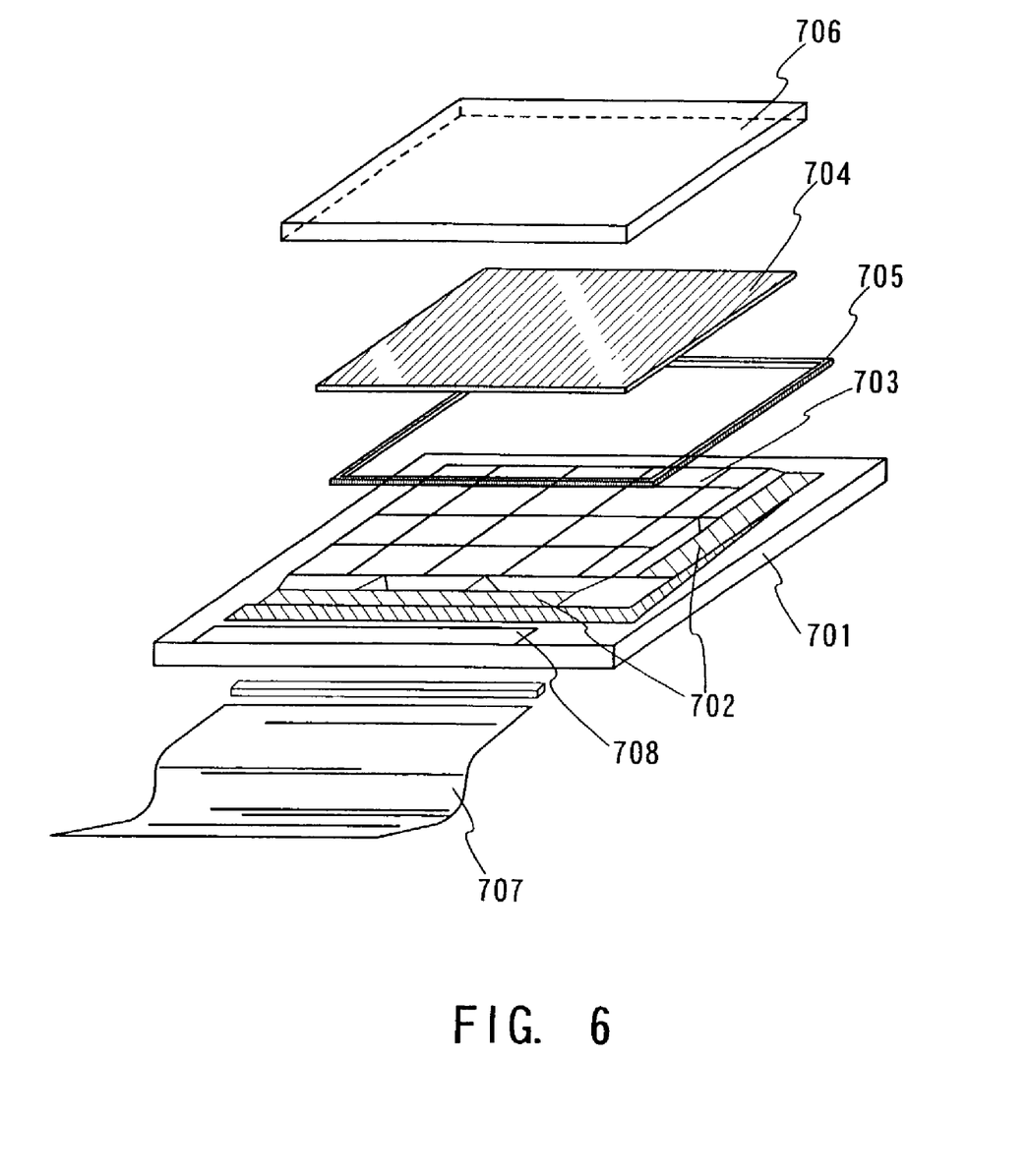
FIG. 6 is a diagram of an example of a construction of the composite product.

As the composite product, FIG. 6 illustrates one example of a construction of an electro luminescent, hereinafter EL, display device comprising a combination of an active matrix substrate in which element groups 702 and 703 comprising a thin film transistor, hereinafter TFT, are formed on a substrate 701 comprising glass or plastic, and a display unit in which a pixel portion is formed from an element group 704 comprising EL elements. The element groups 702 and 703 consisting of the TFTs are manufactured at the first production line 101, and the element group 704 consisting of the EL elements is manufactured at the second production line 102.

Further, at the second production line 102, in order to modularize the EL display device, a seal member 705 and a sealing board 706 are attached, and also, a flexible printed circuit, hereinafter FPC 707, to be connected to an input terminal 703 is attached and connected to an external circuit to thereby modularize the display device. Further, the module is incorporated into a portable telephone, a fixed telephone, a personal computer or a PDA or other such electronic equipment or information instrument, and thus the composite product is completed.

In the composite product as described above, when manufacturing the TFT, it is necessary to cleanse the manufacturing environment in order to prevent physical contamination by dust and the like, chemical contamination by phosphorus, boron, organic gasses and the like, and chemical contamination of metals such as iron, nickel, sodium or of alkali metals. However, the organic EL elements require alkali metals or alkali earth metals as its structural elements. Thus, the production of this kind of composite product on an integrated production line introduces contradictory factors in the actual implementation thereof, and thus requires a significant amount of labor. On the other hand, the first production line 101 and the second production line 102 are physically or geographically separated or distinguished as belonging to different corporations, and thus are arranged at mutually removed locations or areas, whereby the above-mentioned problem is eliminated.

The requirements for constructing the production line have been described above. In order to achieve development, manufacture and sales of a composite product within a short amount of time, the research and development department and the design and prototype production department play an important role, and the production system of the present invention includes these departments.

A technique relating to a new product or manufacturing method, a driving method therefor and the like, which is provided by the research and development department 103, holds a patent right, a trademark right, a design right, or other such industrial property right. Based on this newly developed technique, the design and prototype production department creates mass production prototypes and performs reliability testing and the like, and the thus obtained technical information is reflected on the manufacturing devices and the process conditions for the first production line 101.

The research and development department 103 and the design and prototype production department 104, and the first production line 101 and the second production line 102, may each be owned by separate corporations. The patented invention that is provided by the corporation that owns the research and development department 103 is protected by means of giving the corporation that owns the first production line 101 a non-exclusive license or an exclusive license with respect to the production method. Further, as for the corporation that owns the second production line 102, it is given a non-exclusive license or an exclusive license for the product that was produced at the first production line 101, thereby achieving protection of the patent. The royalties accrued may be used to develop an even more superior product, whereby research and development and diffusion of the composite product into the marketplace are accelerated.

However, on the other hand, it is practically impossible to secure all industrial property rights for composite products that are becoming increasingly sophisticated. Thus, for example, it would also be a reasonable strategy to introduce technology relevant to the patented invention from a corporation that owns another research and development department 105, and obtain a non-exclusive or exclusive license for this. As a result, the specific corporation which owns the research and development department 103 and the design and prototype production department 104 can concentrate its capital in its own field of strength, and thus the corporation which owns the manufacturing line can diversify its risks.

The development department which performs the system design, the logical design for the function and logic determining and the logical circuitry functions, and the layout design that determines the specific wiring patterns, the manufacturing department which manufactures the semi-finished products, and the manufacturing department which receives the semi-finished product and manufactures the finished product, are each separated from each other and are independently established, and their functions are thus distributed. By interactively linking these functions with each other and combining the elements supported by intellectual property rights, risk distribution can be realized.

What is claimed is:

1. A production system for a product assembled from a plurality of element groups, comprising:
    means for inputting functional and operational product information associated with a first element group, wherein the functional and operational product information comprises at least one selected from the group consisting of: system layout, logical design, layout design, and manufacturing process design, wherein the means for inputting is associated with a first independent business entity and wherein the first independent business entity possesses an industrial property right that is associated with said functional and operational product information;
    a first information processing device including a first attributes information storage area for receiving and storing the functional and operational product information associated with the first element group;
    means for producing the first element group of the product based on the functional and operational product information in accordance with conditions associated with the industrial property right, wherein the means for producing is associated with a second business entity;
    means for combining a second element group with the first element group, producing the product, and selling at least one product in which the first and second element groups have been combined, wherein the means for combining is associated with a third independent business entity, and
    means for determining, in the third independent business entity, and for sending, from the third independent business entity, production yield and production plan information for each type of the product to the information processing device of the first independent business entity.

2. A production method for manufacturing a product assembled from a plurality of element groups, comprising:
    storing, in an information processing device of a first independent business entity having an industrial property right associated with said product, functional and operational product information, including at least one selected from the group consisting of: a system design, a logical design, a layout design and a manufacturing process design, and storing an identifier for identifying a type of the product, and corresponding manufacturing process and processing conditions;
    retrieving, by a second independent business entity, the functional and operational product information from the information processing device of the first independent business entity,
    manufacturing, in the second business entity and in accordance with conditions associated with the industrial property right, elements of a first element group of the product according to the product information retrieved from the information processing device and of the first independent business entity according to production plan information corresponding to the type of the product;
    manufacturing, in a third independent business entity and in accordance with conditions associated with the industrial property right, elements of a second element group to be assembled with at least one element of the first element group;
    assembling, at the third independent business entity, the product with at least elements of the first and second element groups; and
    determining, in the third independent business entity, and sending, from the third independent business entity, production yield and production plan information for each type of the product to the information processing device of the first independent business entity.

3. A production method for manufacturing a product assembled from a plurality of element groups, comprising:
    performing, in a first independent business entity having an industrial property right associated with said product, at least one selected from the group consisting of: system design, logical design, layout design, and manufacturing process design of the product;
    storing, in a first attributes information storage area of a first information processing device, an identifier for identifying a type of the product and corresponding manufacturing process and processing conditions;
    creating, in a second independent business entity and in accordance with conditions associated with the industrial property right, a manufacturing process program based on information in the first attributes storage area in the information processing device;
    recording, in a second attributes information storage area of a second information processing device, the identifier and production information including production volume, a production schedule, and a lot number, for the type of product corresponding to the identifier;
    manufacturing elements of a first element group of the product according to the production information;
    manufacturing, in a third independent business entity and in accordance with conditions associated with the industrial property right, elements of a second element group, wherein at least one element of the second element group is to be assembled and fit with at least one element of the first element group; and
    recording, in a third attributes information storage area of a third information processing device, a production yield and a production plan information for each type of the product,
    wherein:
    the first, second and third information processing devices are connected via one of special lines or public lines,
    the first independent business entity and the second independent business entity share the first attributes information storage area, and
    the second independent business entity and the third independent business entity share the second attributes information storage area and the third attributes information storage area.

4. A production method for manufacturing a product assembled from a plurality of element groups, comprising:
    performing, in a first independent business entity having an industrial property right associated with said product, at least one selected from the group consisting of:

system design, logical design, layout design, and manufacturing process design of the product;

storing, in a first attributes information storage area of a first information processing device, an identifier for identifying a type of the product and corresponding manufacturing process and processing conditions;

creating, in a second independent business entity and in accordance with conditions associated with the industrial property right, a manufacturing process program based on information in the first attributes information storage area in the first information processing device;

recording, in a second attributes information storage area of a second information processing device, the identifier and production information including production volume, a production schedule, and a lot number for the type of product corresponding to the identifier;

manufacturing an element of a first element group of the product according to the production information;

forming a protective film on the element of the first element group to prevent breakage of the first element group due to at least one of environmental pollution and static electricity;

removing the protective film from a first substrate in a third independent business entity;

manufacturing, in the third independent business entity and in accordance with conditions associated with the industrial property right, elements of a second element group, wherein at least one element of the second element group is to be assembled and fit with at least one element of the first element group; and recording, in a third attributes information storage area of a third information processing device, a production yield and a production plan information for each type of the product;

wherein:

the first, second and third information processing devices are connected via one of special lines or public lines, the first independent business entity and the second independent business entity share the first attributes information storage area, and the second independent business entity and the third independent business entity share the second attributes information storage area and the third attributes information storage area.

5. A production method for manufacturing an integrated product assembled from a plurality of element groups, comprising:

performing, in a first independent business entity having an industrial property right associated with said integrated product, at least one selected from the group consisting of: system design, logical design, layout design, and manufacturing process design of the integrated product;

storing, in a first attributes information storage area of a first information processing device, an identifier for identifying a type of the integrated product and corresponding manufacturing process and processing conditions;

creating, in a second independent business entity and in accordance with conditions associated with the industrial property right, a manufacturing process program based on information in the first attributes information storage area of the first information processing device;

manufacturing elements of a first element group of the integrated product based on information in a second attributes information storage area in which the identifier and production yield for a corresponding product type are stored;

manufacturing, in a third independent business entity and in accordance with conditions associated with the industrial property right, elements of a second element group, wherein at least one element of the second element group is to be assembled and fit with at least one element of the first element group;

establishing a production plan information for each type of the integrated product; and storing, in a third attributes information storage area of a third information processing device, the identifier and production yield for the corresponding product type;

wherein:

at a first production line owned by the second independent business entity, a first identifier is assigned to each of a first plurality of substrates and processing conditions for each of the first plurality of substrates are assigned in association with the first identifier;

information relating to the processing conditions is stored in the second attributes information storage area of a second information processing device;

one grouping comprising the first plurality of substrates is loaded onto a carrier;

a second identifier for distinguishing the one grouping is assigned to the carrier;

management information comprising an aggregate of processing conditions based on the first identifier is recorded in the second attributes information storage area of the second information processing device;

a manufacturing process is managed based on process progress information obtained on the basis of the second identifier and processing information obtained on the basis of the first identifier;

the first element group is formed to each of plural sections divided up on the first plurality of substrates;

at least one of a first quality information and first characteristic information relating to the first element group formed on the first plurality of substrates between specific processes in a first process is collected and associated with the first identifier and saved in the second information processing device, at a second production line owned by the third independent business entity, the first plurality of substrates is divided into a second plurality of substrates;

one grouping consisting of the second plurality of substrates is treated as a second lot and is processed according to a second process;

the second element group is formed in correspondence with a plurality of sections divided up on the second plurality of substrates;

at least one of a second quality information, second characteristic information relating to the second element group between specific processes in the second process, a third quality information, and product information relating to where the first element group and the second element group have been composed, is collected;

at least one of the first quality information and the first characteristic information is collated with at least one of the second quality information, the second characteristic information, the third quality information, and the product information;

information specifying an address of a section of a first substrate recognized as a non-defective product is recorded in the third attributes information storage area in the third information processing device;

each of the second plurality of substrates is separated into the sections to generate single-unit functional members; and only functional members which the address-specifying information indicates are non-defective products are selected and integrated with other functional members and modularized.

6. A production method for manufacturing an integrated product assembled from a plurality of element groups, comprising:

performing, in a first independent business entity having an industrial property right associated with said integrated product, at least one selected from the group consisting of: system design, logical design, layout design, and manufacturing process design of the integrated product;

storing, in a first attributes information storage area of a first information processing device, an identifier for identifying a type of the integrated product and corresponding manufacturing process and processing conditions;

creating, in a second independent business entity and in accordance with conditions associated with the industrial property right, a manufacturing process program based on information in the first attributes information storage area of the first information processing device;

manufacturing elements of a first element group of the integrated product based on information in a second attributes information storage area in which the identifier and production yield for a corresponding product type are stored;

manufacturing, in a third independent business entity and in accordance with conditions associated with the industrial property right, elements of a second element group, wherein at least one element of the second element group is to be assembled and fit with at least one element of the first element group;

establishing a production plan information for each type of the integrated product; and storing, in a third attributes information storage area of a third information processing device, the identifier and production yield for the corresponding product type;

wherein:

at a first production line owned by the second independent business entity, a first identifier is assigned to each of a first plurality of substrates and processing conditions for each of the first plurality of substrates are assigned in association with the first identifier;

information relating to the processing conditions is stored in the second attributes information storage area of a second information processing device;

one grouping comprising the first plurality of substrates is loaded onto a carrier;

a second identifier for distinguishing the one grouping is assigned to the carrier;

management information comprising an aggregate of processing conditions based on the first identifier is recorded in the second attributes information storage area of the second information processing device;

a manufacturing process is managed based on process progress information obtained on the basis of the second identifier and processing information obtained on the basis of the first identifier;

the first element group is formed to each of plural sections divided up on the first plurality of substrates;

at least one of a first quality information and first characteristic information relating to the first element group formed on the first plurality of substrates between specific processes in a first process is collected and associated with the first identifier and saved in the second information processing device, a protective film is formed on a first substrate to prevent breakage of the first element group due to at least one of environmental pollution and static electricity, and the protective film is removed from the first substrate in the third independent business entity, at a second production line owned by the third independent business entity, after the protective film is removed, the first plurality of substrates is divided into a second plurality of substrates;

one grouping comprising a second substrate is treated as a second lot and is processed according to a second process;

the second element group is formed in correspondence with a plurality of sections divided up on the second plurality of substrates;

at least one of a second quality information, second characteristic information relating to the second element group between specific processes in the second process, a third quality information, and product information relating to where the first element group and the second element group have been composed is collected;

at least one of the first quality information and the first characteristic infonnation is collated with at least one of the second quality information, the second characteristic information, the third quality information, and the product information;

information specifying an address of a section of the second substrate recognized as a non-defective product is recorded in the third attributes information storage area in the third information processing device;

each of the second plurality of substrates is separated into the sections to generate single-unit functional members; and only functional members which the address-specifying information indicates are non-defective products are selected and integrated with other functional members and modularized.

* * * * *